United States Patent
Boggs et al.

[15] 3,666,107
[45] May 30, 1972

[54] FILTER UNIT

[72] Inventors: Weldon C. Boggs, Tampa; Charles A. Turcotte, Daytona Beach, both of Fla.

[73] Assignee: Food Research & Equipment Company, Tampa, Fla.

[22] Filed: Sept. 17, 1970

[21] Appl. No.: 73,015

[52] U.S. Cl. .......................... 210/238, 210/347, 210/488
[51] Int. Cl. ........................ B01d 35/02, B01d 29/34
[58] Field of Search .......... 210/347, 238, 496, 499, 486, 210/487

[56] References Cited

UNITED STATES PATENTS

| | | | |
|---|---|---|---|
| 2,639,251 | 5/1953 | Kracklauer | 210/347 X |
| 2,430,078 | 11/1947 | Reinsch et al. | 210/486 |
| 1,726,035 | 8/1929 | Loew | 210/347 X |
| 3,297,161 | 1/1967 | Kasten | 210/114 |
| 3,312,351 | 4/1967 | Kasten | 210/307 |
| 3,231,094 | 1/1966 | Wiegand | 210/487 |

Primary Examiner—Frank A. Spear, Jr.
Attorney—Bacon and Thomas

[57] ABSTRACT

A filter unit for separating solids from liquids comprising filter elements each consisting of two dished diaphragm sections of fine mesh material, each section having an inner and outer rim portions with an inclined annular portion adjacent thereto and a series of radial ribs in the area between said inclined portions to stiffen the section. One or more of the filter elements is mounted upon a tubular core having openings adjacent the lowermost section of the filter unit for effecting maximum drainage of liquid from the filter unit. The core is threaded at its lower end for mounting upon an outlet fitting in a housing. A handle is attached to the upper end of the core to facilitate mounting and removal of the filter unit from the housing.

12 Claims, 6 Drawing Figures

INVENTORS
WELDON C. BOGGS
CHARLES A. TURCOTTE
BY Bacon & Thomas
ATTORNEYS

INVENTORS
WELDON C. BOGGS
BY CHARLES A. TURCOTTE
Bacon & Thomas
ATTORNEYS ic
FILTER UNIT

FIELD OF THE INVENTION

This invention relates to filters and more particularly to a new filter unit for removing solids from liquids. More specifically, the present filter is particularly useful in deep fat fryers for continuously filtering cooking oil to remove residue, such as, bread crumbs, batter, food particles, etc., from the oil. As is well known, if the residue is not removed from cooking oil, such residue will soon carbonize and discolor the oil, and greatly shorten its useful life. However, it is to be understood that the present filter unit is not limited in its use to filtering cooking oil, but can be used for filtering other liquids with equal effectiveness.

DESCRIPTION OF THE PRIOR ART

Various types of filters and materials have been heretofore used for filtering cooking oil and the like, but these have not been entirely satisfactory. A filter including a bag made from "Osnaburg" cloth, does an acceptable job, but has a limited useful life and does not remove the very fine particles from the coking oil and, therefore, a more durable and effective filter is desirable.

SUMMARY OF THE INVENTION

The present filter unit overcomes the foregoing objections in that the filter element is made of closely woven stainless steel screen material preferably coated with TEFLON and capable of removing food particles as small as about 100 microns. The filter unit may comprise one or more filter elements mounted upon a tubular steel core, the core being closed at one end and threaded at its other end for mounting upon a fitting in a housing or filter bowl. Each filter element comprises upper and lower diaphragm-like sections of frusto-conical or dished formation arranged with their dished sides in confronting relation. The uppermost and lowermost sections in a multi-element filter unit have flat marginal rim portions that are connected with a stainless steel disc and ring, respectively, mounted on the core, and the intermediate sections are welded or fused together at their adjacent inner and outer flat marginal rim portions, the inner marginal portions being radially spaced from the core. Openings are formed in the core which communicate with the interior of the filter elements, thus enabling the filtered liquid to flow through the core. Each filter section is reinforced against distortion and collapse by inner and outer annular portions inclined at an angle to the plane of the filter element, and by radially disposed reinforcing ribs located in the area between said inclined annular portions.

Accordingly, the principal object of the invention is to provide a filter element that is effective for removing very fine solids from liquids, and which is non-corrosive and easy to clean.

Another object is to provide a filter element that can be combined with any desired number of similar filter elements to provide a filter unit of any desired capacity.

Another object is to provide a filter unit that is of rugged construction and has a long life, thereby avoiding the expense of frequent replacement.

A further object is to provide a filter unit that includes a built-in handle so that the unit can be readily installed and removed from a housing for cleaning or inspection purposes.

A still further object is to provide a filter unit that can be drained of all liquid prior to removal from its housing.

A still further object is to provide a filter unit that is especially adapted for continuously filtering cooking oil in a deep fat fryer with a minimum tendency to clog.

Still another object is to provide a filter unit that can be readily manufactured at low cost.

Other objects and advantages of the invention will be apparent from the following description taken in conjunction with the accompanying drawings.

DESCRIPTION OF THE PREFERRED EMBODIMENTS

Figure 1:
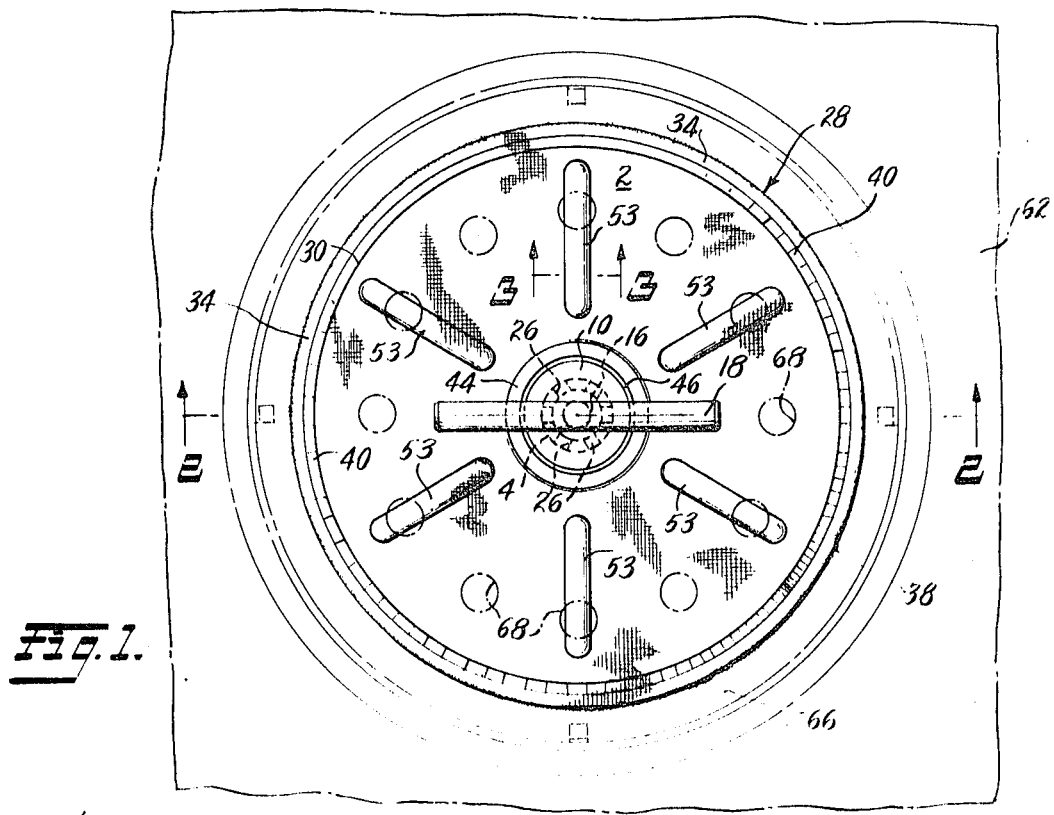
FIG. 1 is a plane view of one embodiment of the present filter unit illustrated in full lines, and shown mounted in a housing or receptacle illustrated in dot-and-dash lines.

Referring to FIGS. 1 to 4, the filter unit is generally identified by the numeral 2 and comprises a tubular carbon steel core 4 having internal threads 6 at its lower end terminating at a shoulder 8. A stainless steel disc 10 is welded to the upper end of the core 4 at its circumference, as indicated at 12. The disc 10 has an opening 14, in which the lower end of the shank 16 of a T-shaped handle 18 is secured by a continuous weld, as indicated at 20. A stainless steel ring 22 is welded at its inner circumference to the core 4 near the lower end thereof, as indicated at 24. A plurality of radial openings 26 is drilled through the core 4, tangent with the upper surface of the ring 22, to facilitate draining of all liquid from the interior of the filter unit 2.

Figures 2, 3:
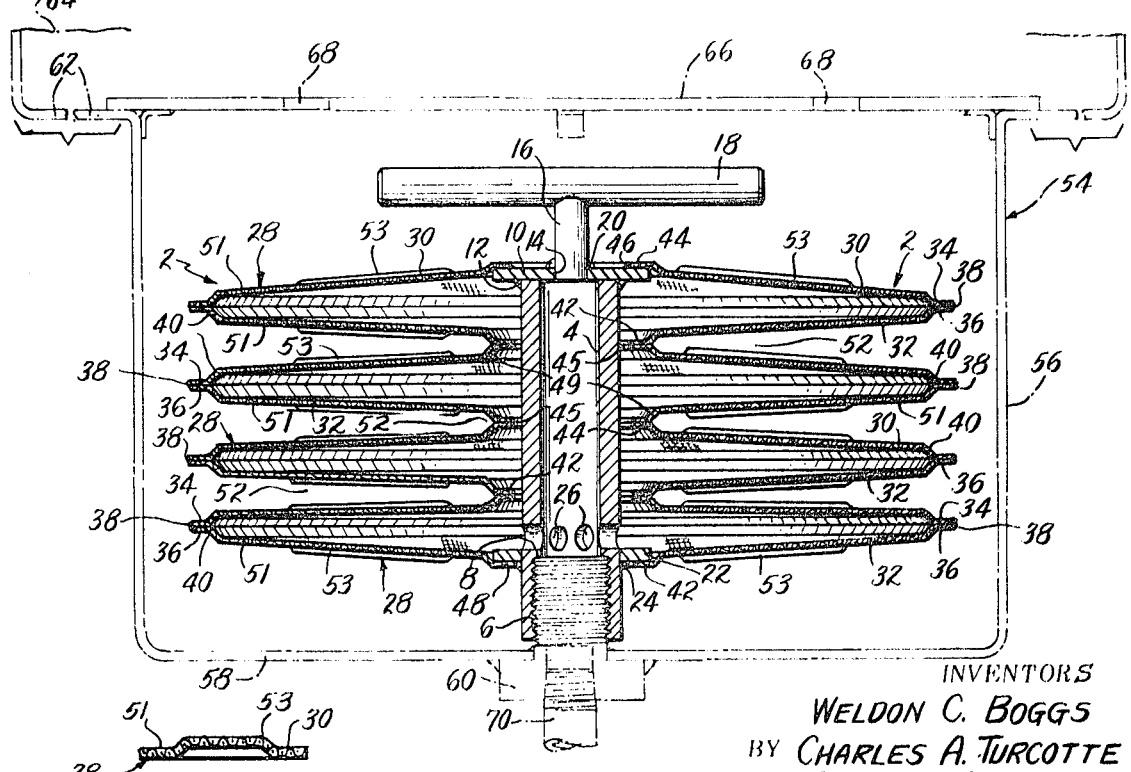
FIG. 2 is an enlarged vertical sectional view through the filter unit and housing, taken on the line 2—2 of FIG. 1.
FIG. 3 is a fragmentary sectional view through one of the sections of a filter element, taken on the line 3—3 of FIG. 1, and particularly illustrating the shape of one of the stiffening ribs.
Figure 4:
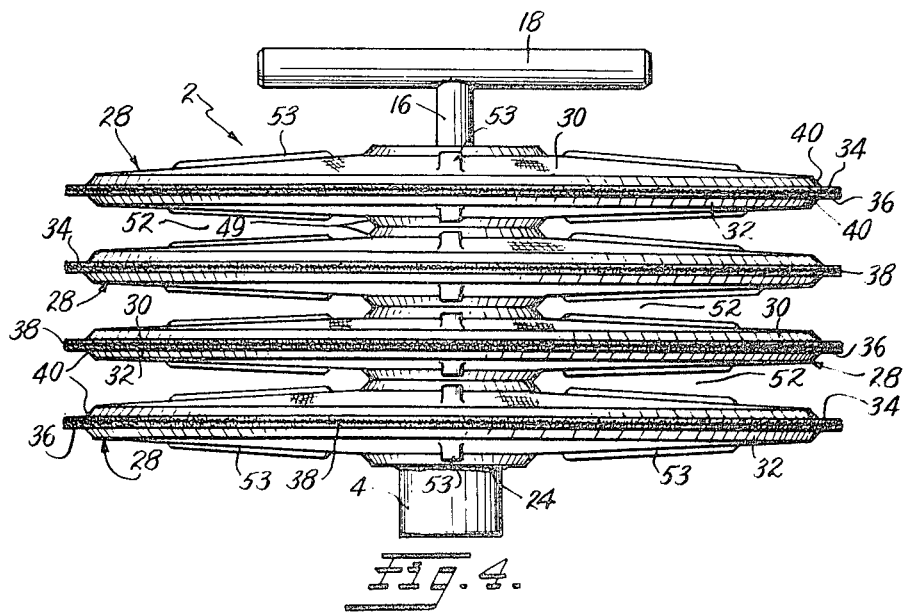
FIG. 4 is an elevational view of the filter shown in FIG. 2.

The filter unit 2 comprises one or more filter elements 28, four such elements 28 being shown in FIG. 2, it being understood that any number of elements can be employed, depending upon the environment, in which the filter unit 2 is to be used. Each filter element 28 comprises two identical annular diaphragms or sections, an upper section 30 and a lower section 32. The sections 30 and 32 are preferably made of stainless steel woven wire mesh material providing openings of a size that will prevent passage therethrough of particles as small as 160 microns. Stainless steel wire 0.016 inches and 0.011 inches in diameter is used to provide a 24 × 110 mesh. A coating of Teflon applied to the mesh material reduces the size of the openings therein to about 100 microns, thus enabling the same to filter out smaller particles than when the coating is omitted, as may be done in some instances.

As is best shown in FIG. 2, the filter sections 30 and 32 are each of truncated cone shape, or dished, and are disposed with the concave sides thereof confronting each other. Both sections 30 and 32 have flat marginal or rim portions 34 and 36, respectively, that contact each other and are welded or fused together throughout their peripheral edges, as indicated at 38. Adjoining each of the rim portions 34, 36 is an annular stiffening portion 40 that is disposed on an angle of about 45° to the horizontal plane of the sections 30, 32. Each of the lower sections 32 has a flat inner marginal portion 42, and each of the upper sections 30 has a flat inner marginal portion 44. The adjacent marginal portions 42 and 44 contact and are welded or fused together throughout their periphery, as indicated at 45. The inner rim portion 44 of the uppermost section 30 is circumferentially welded to the disc 10, as indicated at 46, and the inner rim portion 42 of the lowermost section 32 is circumferentially welded to the ring 22, as indicated at 48. Adjoining each of the inner rim portions 42, 44, is an annular stiffening portion 49 inclined on an angle of about 45° to the horizontal. Between the stiffening portions 48 and 49 is a relatively large annular portion 51 inclined on an angle of about 3° to the horizontal. This design makes it easy to get access to the spaces 52 between adjacent sections for cleaning purposes. The diameter of the inner edges of the marginal portions 42 and 44 is greater than the outside diameter of the core 4, so that when a plurality of filter elements 28 is employed, they are all in free communication with each other throughout the height of the core 4 and are also in communication with the openings 26.

Referring to FIG. 3, each of the sections 30, 32 has a series of external radial deformations 53 in the annular area 51 that serve as stiffening ribs functioning to retain the sections in a dished condition, and aid in preventing collapse of the sections as the liquid being filtered is drawn therethrough.

The filter unit 2 can be mounted in any suitable housing or receptacle, and by way of example, a housing 54 is shown in dot-and-dash lines with the filter unit 2 mounted within it. The housing 54 includes a side wall 56 and a bottom wall 58. An externally threaded outlet fitting 60 projects upwardly into the housing and is received in the threaded opening 6 of the core 4, with the upper end of the fitting tightly abutting against the shoulder 8 to form a seal. The side wall 56 may depend from the bottom wall 62 of another container 64, which, for example, may be a cooking pot of a deep fat fryer, in which event the housing 54 may be considered a filter bowl. The open end of the housing 54 may be closed by a cover plate 66 having openings 68 through which liquid, such as cooking oil, having entrained solids can enter the housing 54.

A suction pipe 70 is connected with the fitting 60 exteriorly of the housing 54 and may be connected with a pump (not shown) as will be readily understood. Contaminated liquid entering the housing 54 will be drawn through the filter elements 28 by the pump, and any solid matter entrained in the liquid will be prevented from passing through the filter elements to the interior of the filter elements and will thus either be collected in the housing 54 or be deposited on the filter elements 28.

The liquid entering the filter unit 2 through the minute openings in the filter sections 28 will enter the space surrounding the core 4, and pass out of the filter unit through the openings 26 and into the fitting 60 for discharge through the pipe 70. The filtered liquid may be returned by the pump to the container 64 by means not shown.

The present filter unit with its foraminous elements is not limited to use in any particular environment as will be readily understood. However, it is particularly adapted to be used to filter the cooking oil in a deep fat fryer, which invariably contains batter and other food particles that will carbonize and shorten the life of the cooking oil, unless completely removed. For example, the present filter unit may be employed in a deep fat fryer of the type disclosed in Quednau, U.S. Pat. No. 3,410,199.

The filter sections 30 and 32 are preferably coated with Teflon to prevent solids, and particularly hot solids, from sticking to the surfaces thereof, and to thus facilitate cleaning of the filter unit. The presence of the Teflon also reduces any tendency for the filter to clog.

Whenever it is desired to clean the filter unit 2, the housing 54 is drained to at least the level of the openings 26 in the core 4. Since these openings are located at the lowest possible level within the filter unit 2, all liquid will be drained from the interior of said unit. After the liquid has been drained, the handle 18 can be rotated to unscrew the filter unit 2 from the fitting 60, so that the unit 2 can be bodily removed and cleaned. Since the filter sections 30 and 32 are Teflon coated, foreign particles will not adhere thereto and this is especially true of batter and other residue present in hot cooking oil. The filter unit 2 can be immersed in hot water containing a mild detergent and thoroughly washed and cleaned with a brush if necessary and then flushed out with clear water and remounted in the housing 54. The ample space 52 between the filter elements 28 makes it easy to get to the innermost portion of the spaces to remove any solids that may have become lodged there.

Figure 5:
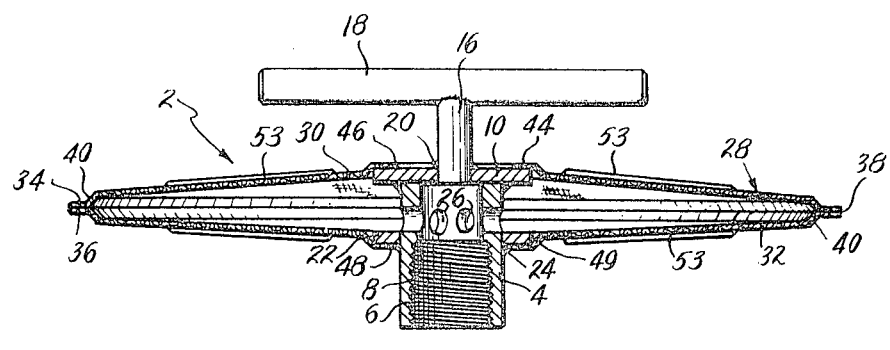
FIG. 5 is a vertical sectional view through a second embodiment of the filter unit consisting of one filter element.

FIG. 5 illustrates another embodiment of the invention in which a single filter element 28 is employed with a relatively shorter core 4. Other parts shown corresponding to those described above have been identified by the same reference characters.

Figure 6:
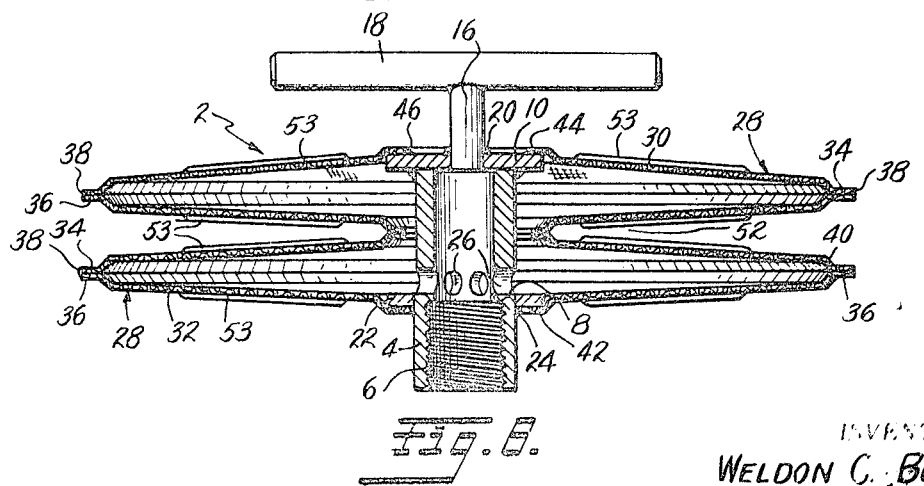
FIG. 6 is a vertical sectional view through a third embodiment of the filter unit consisting of two filter elements.

FIG. 6 illustrates a third embodiment of the invention comprising two filter elements 28, with other parts previously described identified by corresponding reference numerals. FIG. 2, which shows four filter elements 28 will adequately serve to illustrate the manner in which any desired number of filter elements 28 can be assembled to provide a filter unit of any desired capacity.

The above-described filter units are easy to install and remove, are highly efficient, can be easily cleaned when necessary and are ruggedly constructed to resist damage in handling and collapse in normal use. Thus, a long and satisfactory life of the filter unit is assured, avoiding any necessity for frequent replacement.

It will be understood that minor changes may be made in the details of design and construction of the filter units disclosed herein and in the character of the foraminous material used, without departing from the principles of the invention or the scope of the annexed claims.

We claim:

1. A filter unit to be removably mounted in a housing having an upper end with an inlet opening and a bottom wall with a threaded outlet opening, comprising: a tubular core closed at its upper end and having an open, threaded lower end for connecting the same to said threaded outlet opening; and at least one filter element mounted upon said core, the filter element comprising two annular, frusto-conical sections surrounding said core and disposed in confronting relation, said sections being made of wire mesh filter material and including flat inner and outer marginal portions and an annular stiffening portion adjacent each of said flat marginal portions inclined at an angle to the plane of the sections, said sections having their outer margins permanently connected together, said core having openings extending therethrough communicating with the interior of said filter element.

2. A filter unit as defined in claim 1, in which the sections of the filter element each have outwardly displaced radial stiffening ribs disposed between the inclined annular stiffening portions.

3. A filter unit as defined in claim 1, in which the core is closed at its upper end by a disc permanently secured thereto.

4. A filter unit as defined in claim 3, in which a handle is secured to the disc.

5. A filter unit as defined in claim 1, in which the core is internally threaded and the threads terminate at a shoulder projecting inwardly beyond said threads.

6. A filter unit as defined in claim 1, in which a single filter element is mounted upon the core and the inner margins of the sections of said filter element are welded to the core.

7. A filter unit as defined in claim 1, in which a plurality of filter elements are mounted upon the core, and wherein the inner marginal edges of the sections comprising said filter elements, except the topmost and lowermost sections, are spaced from said core, and wherein the inner marginal edges of adjacent sections are secured together.

8. A filter unit as defined defined in claim 7, in which the core is closed at one end by a disc, and the upper section of the uppermost filter elements is secured to said disc.

9. A filter unit as defined in claim 8, wherein a ring is secured to the core near the open end thereof, and the lower section of the lowermost filter element is secured to said ring.

10. A filter unit as defined in claim 9, in which the openings in the core are in a plane adjacent to the upper face of the ring.

11. A filter unit, comprising: a tubular core; a plurality of filter elements mounted upon said core, each filter element comprising two dished sections disposed in spaced confronting relation, said sections being made of foraminous material, the sections of each element having their outer margins connected together; a disc forming a closure for one end of said core, the section of the uppermost filter element having an inner marginal portion secured to said disc; a ring mounted upon said core near the other end thereof, the lower section of the lowermost filter element being secured to said ring, the sections of the filter elements between said upper and lower section of said uppermost and lowermost filter elements having inner marginal portions spaced from said core, with the inner margin portions of adjacent sections secured together, said core having a plurality of radial openings extending therethrough in a plane adjacent to the upper face of said ring, said other end of said core being internally threaded with the threads terminating at an inwardly projecting shoulder; and a handle secured to said disc to facilitate mounting said filter unit on, and removing the same from, a threaded support.

12. A filter unit, comprising: a tubular core closed at one end and open at its other end; and one or more filter elements mounted upon said core, each filter element comprising an upper and a lower frusto-conical section surrounding said core and disposed in confronting relation to each other, said sections of each filter element being made of foraminous material and having their outer margins permanently connected together, said core having a single row of openings extending therethrough communicating with the interior of the filter element nearest to the open end of the core and being located closest to the lower section of the filter element nearest to the open end of said core.

* * * * *